(12) United States Patent
Silva et al.

(10) Patent No.: US 10,938,996 B2
(45) Date of Patent: Mar. 2, 2021

(54) CONTROLLING SERVICES PROVIDED TO MOBILE DEVICES WITHIN WIRELESS COMMUNICATION NETWORKS

(71) Applicant: T-Mobile USA, Inc., Bellevue, WA (US)

(72) Inventors: Karunakalage Viraj Rakitha Silva, Renton, WA (US); Mayank Kaul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/361,646

(22) Filed: Mar. 22, 2019

(65) Prior Publication Data

US 2020/0304646 A1    Sep. 24, 2020

(51) Int. Cl.
*H04M 15/00* (2006.01)
*H04W 4/24* (2018.01)
*H04L 12/14* (2006.01)
*H04W 8/06* (2009.01)

(52) U.S. Cl.
CPC .... *H04M 15/8038* (2013.01); *H04L 12/1407* (2013.01); *H04M 15/64* (2013.01); *H04M 15/66* (2013.01); *H04W 4/24* (2013.01); *H04W 8/06* (2013.01)

(58) Field of Classification Search
CPC .. H04M 15/8038; H04M 15/66; H04M 15/64; H04L 12/1407; H04W 4/24; H04W 8/06
See application file for complete search history.

(56) References Cited

U.S. PATENT DOCUMENTS

| | | | | |
|---|---|---|---|---|
| 2007/0099609 A1* | 5/2007 | Cai | ...................... | H04L 41/5054 455/428 |
| 2012/0309346 A1* | 12/2012 | Yang | ...................... | H04L 12/14 455/406 |
| 2014/0364086 A1* | 12/2014 | Huang | ...................... | H04W 4/50 455/411 |
| 2015/0326823 A1* | 11/2015 | Oh | ...................... | H04L 65/1059 348/14.07 |
| 2016/0295408 A1* | 10/2016 | Chen | ...................... | H04W 4/90 |
| 2017/0230236 A1* | 8/2017 | Kim | ...................... | H04L 41/08 |
| 2018/0295498 A1* | 10/2018 | Neal | ...................... | H04W 8/12 |
| 2019/0261260 A1* | 8/2019 | Dao | ...................... | H04W 8/08 |

* cited by examiner

*Primary Examiner* — Mazda Sabouri
(74) *Attorney, Agent, or Firm* — Lee & Hayes, P.C.

(57) ABSTRACT

Architecture is described for providing interfaces between a presence server and a Policy and Charging Function (PCRF) node, an Online Charging System (OCS) node, and an Equipment Identity Register (EIR) node. Techniques are also described for determining, by the presence server, various potential rules and limitations for providing services by the wireless communication network to mobile devices based upon, for example, a particular subscriber plan, roaming, restrictions based upon mobile device type, a need for throttling of data to a mobile device, specific billing rules, etc.

14 Claims, 3 Drawing Sheets

CONTROLLING SERVICES PROVIDED TO MOBILE DEVICES WITHIN WIRELESS COMMUNICATION NETWORKS

BACKGROUND

In recent years, mobile devices have advanced from offering simple voice calling services within wireless communication networks to providing users with many new features. Mobile devices now provide messaging services such as email, text messaging, and instant messaging; data services such as internet browsing; media services such as storing and playing a library of favorite songs; location services; and many others. In addition to the new features provided by the mobile telecommunication devices, users of such mobile telecommunication devices have greatly increased. Such an increase in users is only expected to continue and, in fact, it is expected that there could be a growth rate of twenty times more users in the next few years alone.

Currently, when a first mobile device registers with a wireless communication network, the first mobile device updates a presence server of the wireless communication network with the first mobile device's capabilities. For example, Rich Communication Services (RCS), Unitary Precoding (UP), Video over Long Term Evolution (ViLTE), Voice over Long Term Evolution (VoLTE), etc. When a second mobile device registers with the wireless communication network, the second mobile device does the same thing by updating the presence server with the second mobile device's capabilities.

When the first mobile device wishes to communicate with the second mobile device, the first mobile device contacts the presence server and inquires as to the capabilities of the second mobile device. The presence server responds by providing all of the capabilities of the second mobile device to the first mobile device since the presence server is not aware of and cannot determine various policies, limitations, billing requirements, etc., due to the lack of interfaces between the presence server, the Policy and Charging Function (PCRF) node, the Online Charging System (OCS) node and the Equipment Identity Register (EIR) node. Depending upon the capabilities of the second mobile device, the first mobile device will determine to use, for example, ViLTE, VoLTE, UP, RCS, Multimedia Messaging Service (MMS), Short Message Service (SMS), etc. This can be a problem for an operator of a "home" wireless communication network in that often many services provided by the home wireless communication network are provided free of charge or based upon a subscriber plan that may provide a limited amount or unlimited services within the home wireless communication network. Thus, the services may or may not count against data usage plans of the mobile devices within the home wireless communication network. However, when roaming, a large amount of data may be used based upon services provided by another wireless communication network in which a mobile device is roaming. Generally, the operator of the home wireless communication network needs to pay the operator of the another wireless communication network and this represents money out of the operator of the home wireless communication network's pocket.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
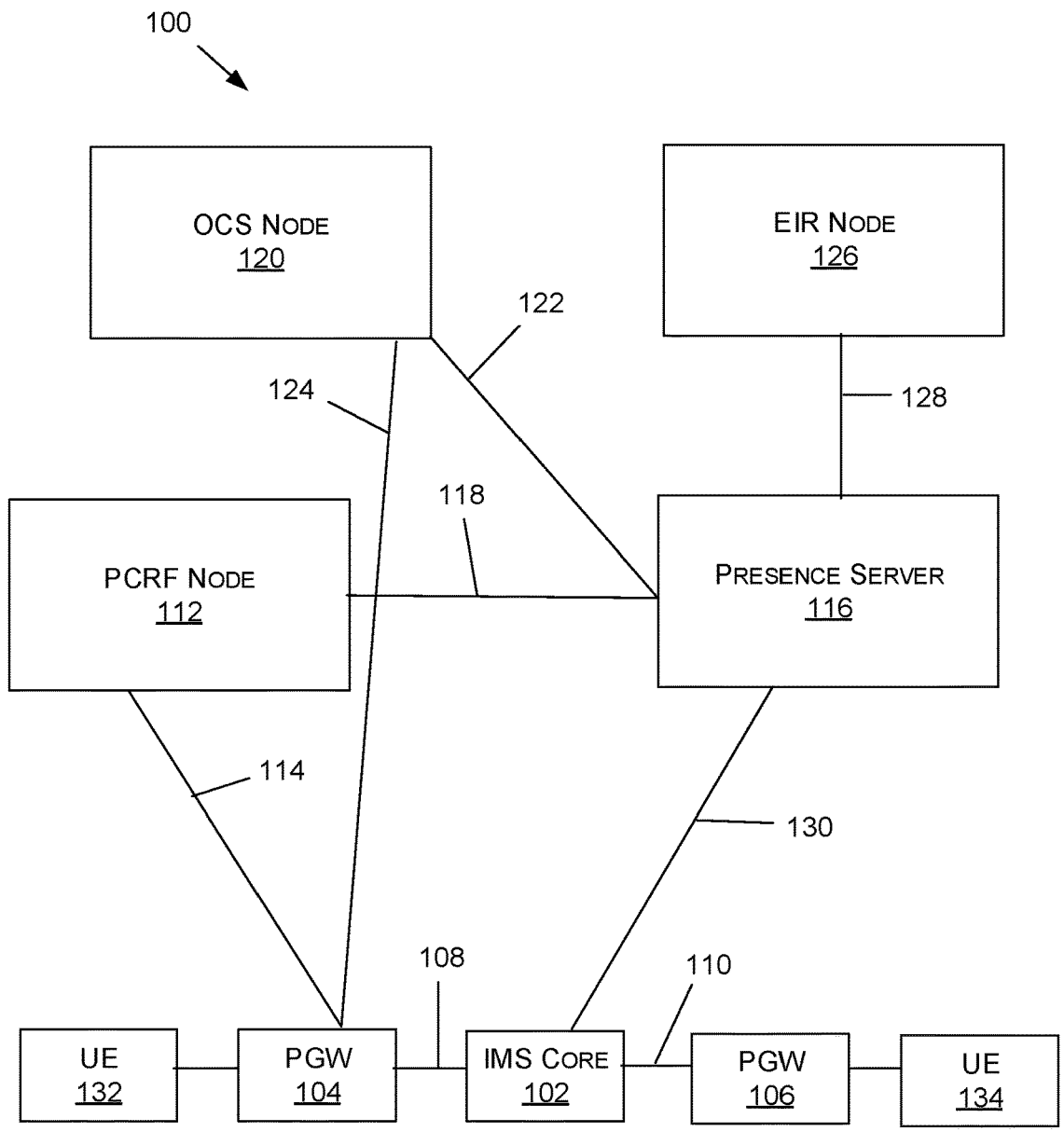
FIG. 1 schematically illustrates an example portion of a wireless communication network, in accordance with various configurations.

Described herein is a wireless communication network that includes architecture for providing interfaces between a presence server and a Policy and Charging Function (PCRF) node, an Online Charging System (OCS) node, and an Equipment Identity Register (EIR) node. Also described herein are techniques for determining, by the presence server, various potential rules and limitations for providing services by the wireless communication network to mobile devices based upon, for example, a particular subscriber plan, roaming, restrictions based upon mobile device type, a need for throttling of data to a mobile device, specific billing rules, etc.

For example, in configurations, the wireless communication network includes an interface that provides connectivity between the presence server and the PCRF node. Additionally, the wireless communication network includes an interface that provides connectivity between the presence server and the OCS node. Finally, an interface is included within the wireless communication network that provides connectivity between the presence server and the EIR node.

Accordingly, the presence server can determine, for example, whether to provide a particular service to a mobile device based upon a particular subscriber plan for services within the wireless communication network. In order to determine specifics of the particular plan and whether or not service should be provided to the mobile device, the presence server may check over the appropriate interface with the PCRF node.

Likewise, if the wireless communication network wants to control various services provided to mobile devices based upon device type, when a mobile device wishes to receive a particular service or services from the wireless communication network, the presence server can check with the EIR node over the appropriate interface. For example, the operator of the wireless communication network may offer a specific deal on a newer device type or model of a mobile device. The presence server may check with the EIR node to determine if the mobile device requesting a service or services is permitted to receive such service or services from the wireless communication network based upon the device type of the mobile device.

Additionally, when a mobile device requests service from the wireless communication network, the presence server may check with the OCS node over the appropriate interface to see if throttling of data is needed. For example, the OCS node may indicate that, yes, data may be allowed or provided for the mobile device but that the transfer of the data needs to be throttled. The OCS node may also provide that certain other billing rules need to be met and provide such information to the presence server.

Thus, when a first mobile device registers with the wireless communication network, the presence server may check the status of the mobile device with one or more of the PCRF node, the OCS node, and/or the EIR node, to determine the various services that may be provided to the first mobile device. Based on the information received from such nodes, the presence server determines which services may be allowed or provided to the first mobile device. When the first mobile device requests the status of a second mobile device from the presence server for communication purposes, the presence server will only respond to the first mobile device with the services that are allowed or provided for the second mobile device within the wireless communication network (which may be only a subset of the services that are allowed or provided for the first mobile device within the wireless communication network), based upon registration of the second mobile device with the wireless communication network. Thus, the first mobile device may be limited on the various types of ways in which the first mobile device may communicate with the second mobile device using services provided by the wireless communication network. For example, due to limitations in data transfer for either of the mobile devices, the first mobile device may only be allowed to communicate with the second mobile device using either RCS, MMS or SMS, as opposed to ViLTE or VoLTE. The request(s) for status and/or capabilities of mobile devices by the presence server from the PCRF node, the OCS node and/or the EIR node may occur during registration of the mobile devices with the wireless communication network, or when services are actually requested by the mobile devices, either for themselves or with respect to other mobile devices.

FIG. 1 schematically illustrates a portion of a wireless communication network 100. The wireless communication network 100 includes an Internet Protocol Media Service (IMS) core 102, a first Packet Data Network Gateway (PGW) 104 and a second PGW 106. The first and second PGWs 104, 106 are coupled to the IMS core 102 via first and second interfaces 108, 110, respectively. The wireless communication network 100 also includes a PCRF node 112 that is communicatively coupled to the first PGW 104 via an interface 114. The wireless communication network 100 also includes a presence server 116. An interface 118 is provided between the PCRF node 112 and the presence server 116.

The wireless communication network 100 also includes an OCS node 120 that is communicatively coupled to the presence server 116 via an interface 122. The OCS node 120 is also communicatively coupled to the first PGW node 104 via an interface 124. The wireless communication network 100 also includes an EIR node 126 that is communicatively coupled to the presence server via an interface 128. While not illustrated, the EIR node 126 may also be communicatively coupled to the first PGW node 104. The presence server 116 is also coupled to the IMS core 102 via an interface 130. A first mobile device or user equipment (UE) 132 may register with the wireless communication network 100 via the first PGW node 104. Likewise, a second UE 134 may register with the wireless communication network 100 via the second PGW node.

It should be noted that the first and second UEs 132, 134 may register with the wireless communication network 100 via either of the first or second PGW nodes 104, 106. Likewise, the second PGW node 106 may include interfaces that provide connectivity of the second PGW with one or more of the PCRF node 112, the OCS node 120, and/or the EIR node 126. Also, as is known in the art, there are generally more nodes included within the wireless communication network 100 that are not illustrated in FIG. 1 for clarity purposes. For example, the wireless communication network 100 generally includes serving gateway (SGW) nodes, and may include multiple PCRF nodes, OCS nodes, EIR nodes, and presence servers, as well as other nodes not mentioned here.

The wireless communication network may be configured according to one or more wireless communication protocols that include, but are not limited to, Global System for Mobile Communications (GSM), IP Multimedia Subsystem or IP Multimedia Core Network Subsystem (IMS), Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA) (including High Speed Downlink Packet Access (HSDPA) and High Speed Uplink Packet Access (HSUPA)), Ultra Mobile Broadband (UMB), and/or the like.

The UEs 132, 134 may comprise any appropriate device, e.g., a stationary device or a portable electronic device, for communicating over a wireless communication network. Examples of such devices include, but are not limited to, mobile telephones, smart phones, cellular telephones, internet protocol (IP) telephones, mobile computers, Personal Digital Assistants (PDAs), radio frequency devices, handheld computers, laptop computers, tablet computers, palmtops, pagers, devices configured as Internet of Things (IoT) devices, IoT sensors that include cameras, integrated devices combining one or more of the preceding devices, and/or the like. As such, the UEs 132, 134 may range widely in terms of capabilities and features.

Briefly, the PCRF node 112, in addition to other functions, keeps track of whether a UE is roaming as well as what subscriber plan within the wireless communication network 100 a UE has, including domestic and international subscriber plans. The OCS node 120, in addition to other functions, keeps track of how much data a UE may use, based upon the UE's subscriber plan, and how much data a UE has used. The EIR node 126, in addition to other functions, keeps track of UE device types and device capabilities and features.

When UE 132 and/or UE 134 wishes to access services within the wireless communication network 100, including communicating with the other UE, the presence server 116 can determine, for example, whether to provide a particular service to the requesting UE based upon a particular subscriber plan of the requesting UE for services within the wireless communication network 100. In order to determine specifics of the particular plan and whether or not service should be provided to the requesting UE, the presence server 116 may check over the interface 118 with the PCRF node 112.

Likewise, if the wireless communication network 100 wants to control various services provided to UEs 132, 134 based upon device type, when UE 132 and/or UE 134 wishes to receive a particular service or services from the wireless communication network 100, the presence server 116 can check with the EIR node 126 over the interface 128 to see if the desired service or services are restricted based upon device type. For example, the operator of the wireless communication network 100 may offer a specific deal on a newer device type or model of a UE for sale. The presence server 116 may check with the EIR node 126 to determine if the UE 132 and/or 134 requesting the service or services is permitted to receive such service or services from the wireless communication network 100 based upon device type of the UEs 132, 134.

Additionally, when UE 132 and/or UE 134 requests service from the wireless communication network 100, the presence server 116 may check with the OCS node 120 over the interface 122 to see if, for example, throttling of data is needed. For example, the OCS node 120 may indicate that, yes, data may be allowed or provided for the UE 132 and/or UE 134 but that the transfer of the data needs to be throttled. The OCS node 120 may also provide that certain other billing rules need to be met in order to provide service to UE 132 and/or UE 134 and provide such information to the presence server 116.

Thus, when UE 132 registers with the wireless communication network 100, the presence server 116 may check the status of UE 132 with one or more of the PCRF node 112, the OCS node 120, and/or the EIR node 126, to determine the various services that may be provided to the UE 132. Based on the information received from the PCRF node 112, the OCS node 120, and/or the EIR node 126, the presence server 116 determines which services may be allowed or provided to UE 132. When UE 132 requests the status of UE 134 from the presence server 116 for communication purposes, the presence server 116 will only respond to UE 132 with the services that are allowed or provided for UE 134 within the wireless communication network 100, based upon registration of UE 134 with the wireless communication network. This is due to when UE 134 registers with the wireless communication network 100, the presence server 116 may check the status of UE 134 with one or more of the PCRF node 112, the OCS node 120, and/or the EIR node 126, to determine the various services that may be provided to the UE 134. Based on the information received from the PCRF node 112, the OCS node 120, and/or the EIR node 126, the presence server 116 determines which services may be allowed or provided to UE 134.

Thus, UE 132 may be limited on the various types of ways in which UE 132 may communicate with UE 134 using services provided by the wireless communication network 100. For example, due to limitations in data transfer for either of the UEs 132, 134, UE 132 may only be allowed to communicate with UE 134 using either RCS, MMS or SMS, as opposed to ViLTE or VoLTE. The request(s) for status and/or capabilities of UEs by the presence server 116 from the PCRF node 112, the OCS node 120 and/or the EIR node 126 may occur during registration of the UEs 132, 134 with the wireless communication network 100, or when services or status are actually requested by UEs 132, 134, either for themselves or with respect to other UEs.

Figure 2:
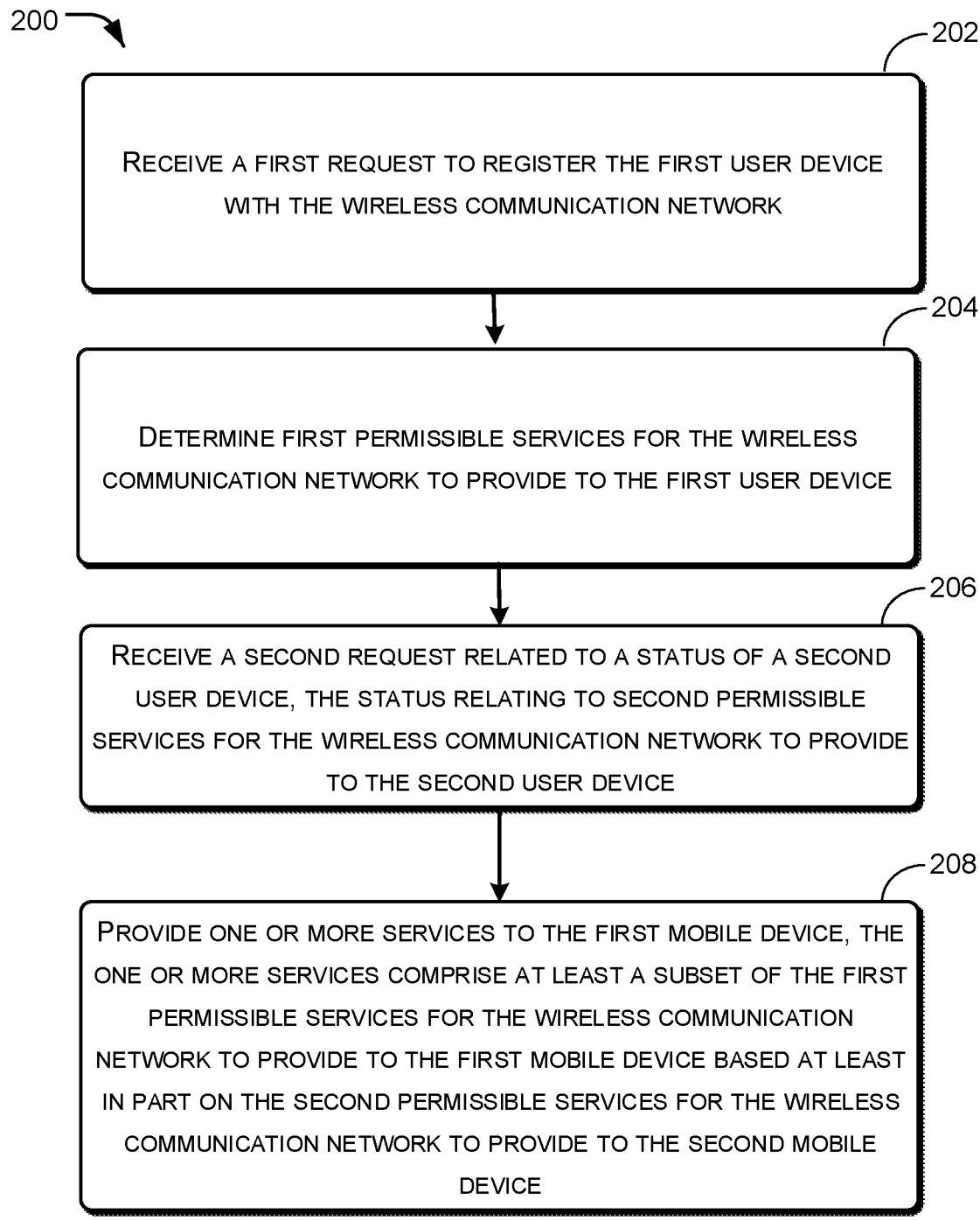
FIG. 2 is a flowchart illustrating an example method of determining allowable and/or permissible services for mobile devices in the wireless communication network of FIG. 1, in accordance with various configurations.

FIG. 2 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 2 is a flow diagram illustrating an example method 200 of determining, by a presence server, e.g., presence server 116, allowable and/or permissible services to provide, by the wireless communication network, to mobile devices, e.g., UEs 132, 134, based upon, for example, a particular subscriber plan, roaming, restrictions based upon mobile device type, a need for throttling of data to a mobile device, specific billing rules, etc. The method may be implemented using interfaces, e.g., interfaces 118, 122 and/or 128, between the presence server and various nodes, e.g., PCRF node 112, OCS node 120 and/or EIR node 126. As illustrated, at block 202, a first request to register a first mobile device with the wireless communication network is received from a first mobile device at the wireless communication network. At block 204, the wireless communication network determines first permissible services for the wireless communication network to provide to the first mobile device.

At block 206, the wireless communication network receives, from the first mobile device, a second request related to a status of a second mobile device. In configurations, the status relates to second permissible services for the wireless communication network to provide to the second mobile device. At block 208, the wireless communication network provides to the first mobile device, one or more services. The one or more services comprise at least a subset of the first permissible services for the wireless communication network to provide to the first mobile device based at least in part on the second permissible services for the wireless communication network to provide to the second mobile device.

Thus, depending on the type of scenario, an operator of the wireless communication network 100 may make a decision for providing services to UEs according to service offerings. For example, when the operator wants to provide a service based on a particular subscriber plan, roaming, etc., the presence server 116 may check with the PCRF node 112. When the operator wants to provide a service based on device type, (e.g., some devices are restricted and others are not to receive certain services), then the presence server 116 may check with the EIR node 126. The presence server 116 may also check with the OCS node 120 depending on if throttling, etc. needs to be applied or certain specific billing rules are met.

Accordingly, for example, when UE 132 attaches to the wireless communication network 100, the presence server 116 may check the status of UE 132 with the PCRF node 112, the OCS node 120 and the EIR node 126. Based on the information received from the PCRF node 112, the OCS node 120 and the EIR node 126, the presence node 116 determines which services should be allowed to UE 132. When UE 132 tries to find the status of UE 134, the presence server 116 will only respond to UE 132 with the services that should be allowed or provided to UE 134. Thus, UE 132 may communicate with UE 134 in a manner permitted by the operator of the wireless communication network 100. As previously noted, the presence server 116 may check the status of UEs 132, 134 when services and or status of a UE are actually requested by the UEs 132, 134.

Figure 3:
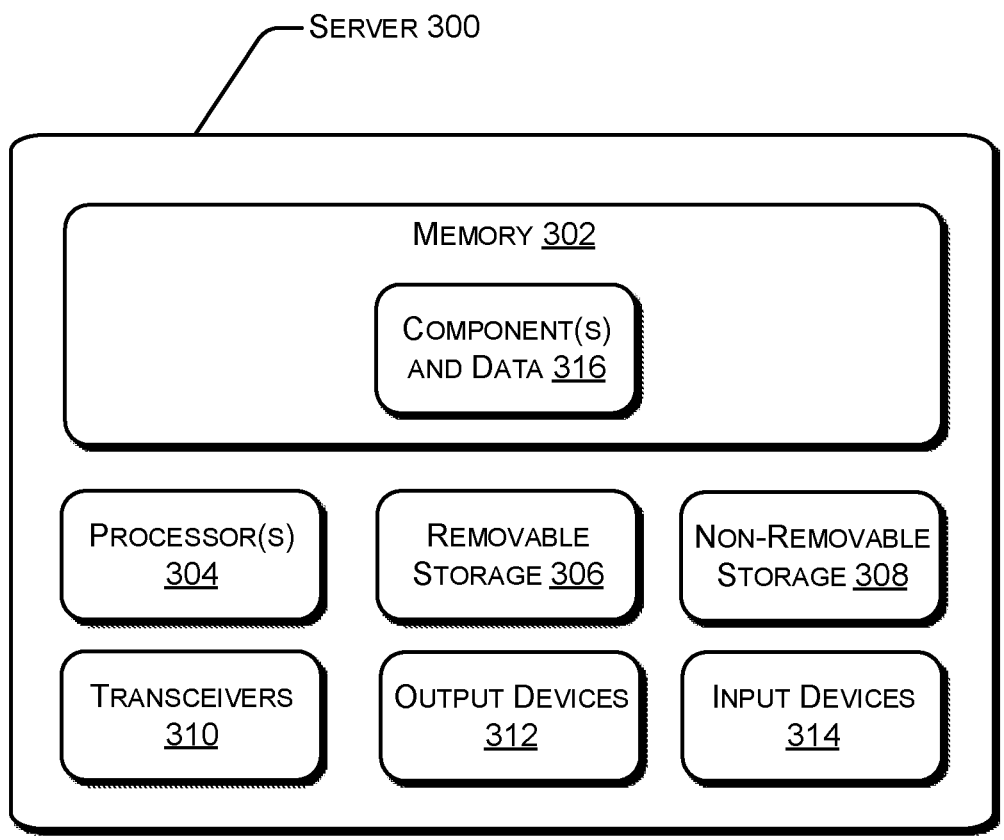
FIG. 3 schematically illustrates a component level view of a server configured for use in the testing environment of FIG. 1 to provide various services of the testing environment of FIG. 1, in accordance with various configurations.

FIG. 3 illustrates a component level view of a server 300 configured for use within a wireless communication network environment, e.g., wireless communication network 100, in order to provide various functionality within the wireless communication network, according to the techniques described herein. For example, the server 300 may implement the presence server 116, e.g., one or more servers 300 may be configured to function as presence server 116. Additionally, the server 300 may implement the PCRF node 112, the OCS node 120 or the EIR node 126, e.g., one or more servers 300 may be configured to function as the PCRF node 112, the OCS node 120 or the EIR node 126.

As illustrated, the server 300 comprises a system memory 302 that may store data and one or more components and/or data 316 for interacting with mobile devices, e.g., UEs 132, 134, as described herein. Also, the server 300 includes processor(s) 304, a removable storage 306, a non-removable storage 308, transceivers 310, output device(s) 312, and input device(s) 314.

In various implementations, system memory 302 is volatile (such as RAM), non-volatile (such as ROM, flash memory, etc.) or some combination of the two. In some implementations, the processor(s) 304 is a Central Processing Unit (CPU), a Graphics Processing Unit (GPU), or both CPU and GPU, or any other sort of processing unit.

The server 300 may also include additional data storage devices (removable and/or non-removable) such as, for example, magnetic disks, optical disks, or tape. Such additional storage is illustrated in FIG. 3 by removable storage 306 and non-removable storage 308. The one or more of the memory 302, the removable storage 306 and/or the non-removable storage 308 may include module(s) and data 316 (illustrated in the memory 302). The module(s) and data 316 may include instructions executable by, for example, the processor(s) 304.

Non-transitory computer-readable media may include volatile and nonvolatile, removable and non-removable tangible, physical media implemented in technology for storage of information, such as computer readable instructions, data structures, program modules, or other data. System memory 302, removable storage 306 and non-removable storage 308 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 300. Any such non-transitory computer-readable media may be part of the server 300.

In some implementations, the transceivers 310 include any sort of transceivers known in the art. For example, the transceivers 310 may include wired communication components, such as an Ethernet port, for communicating with other networked devices. Also, or instead, the transceivers 310 may include wireless modem(s) to facilitate wireless connectivity with other computing devices. Further, the transceivers 310 may include a radio transceiver that performs the function of transmitting and receiving radio frequency communications via an antenna.

In some implementations, the output devices 312 include any sort of output devices known in the art, such as a display (e.g., a liquid crystal display), speakers, a vibrating mechanism, or a tactile feedback mechanism. Output devices 312 also include ports for one or more peripheral devices, such as headphones, peripheral speakers, or a peripheral display.

In various implementations, input devices 314 include any sort of input devices known in the art. For example, input devices 314 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
   receiving, from a first mobile device at a wireless communication network, a first request to register the first mobile device with the wireless communication network, wherein the wireless communication network provides services to mobile devices thereon and the first mobile device has an associated rate plan, a roaming status, a device type, and one or more specific billing rules associated therewith;
   determining, by a presence server of the wireless communication network, first permissible services provided by the wireless communication network to the first mobile device, wherein the determining comprises selecting, by the presence server of the wireless communication network, from amongst the services provided to mobile devices by the wireless network services that are available to the rate plan, the roaming status, the device type, and the one or more specific billing rules associated therewith associated with the first mobile device, wherein the first permissible services includes the services selected by the presence server for the first mobile device;
   receiving, from the first mobile device at the wireless communication network, a second request related to capabilities of a second mobile device, the capabilities relating to second permissible services provided by the wireless communication network to the second mobile device, wherein the second mobile device has an associated rate plan, a roaming status, a device type, and one or more specific billing rules associated therewith;
   determining, by the presence server of the wireless communication network, second permissible services provided by the wireless communication network to the second mobile device, wherein the determining comprises selecting, by the presence server of the wireless communication network, from amongst the services provided to mobile devices by the wireless network services that are available to the second mobile device based on the rate plan, the roaming status, the device type, and the one or more specific billing rules associated with the second mobile device, wherein the second permissible services includes the services selected by the presence server for the second mobile device; and providing, from the wireless communication network to the first mobile device, one or more services by the wireless network that are common to the first permissible services and the second permissible services.

2. The method of claim 1, wherein:

determining the first permissible services provided by the wireless communication network to the first mobile device includes the presence server of the wireless communication network obtaining information from one or more of (i) a Policy and Charging Rules Function (PCRF) node of the wireless communication network, (ii) an Equipment Identity Register (EIR) node of the wireless communication network, and (iii) an Online Charging System (OCS) node of the wireless communication network; and determining the second permissible services provided by the wireless communication network to the second mobile device includes the presence server of the wireless communication network obtaining information from one or more of (i) a Policy and Charging Rules Function (PCRF) node of the wireless communication network, (ii) an Equipment Identity Register (EIR) node of the wireless communication network, and (iii) an Online Charging System (OCS) node of the wireless communication network.

3. The method of claim 1, wherein the second permissible services provided by the wireless communication network to provide to the second mobile device relate to at least one or more of Unitary Precoding (UP), Rich Communication Services (RCS), a Video over Long Term Evolution (ViLTE) protocol, a Voice over Long Term Evolution (VoLTE) protocol, a Short Message Service (SMS) protocol, or a Multimedia Messaging Service (MMS) protocol.

4. The method of claim 1, wherein the first permissible services provided by the wireless communication network to the first mobile device relate to at least one or more of Unitary Precoding (UP), Rich Communication Services (RCS), a Video over Long Term Evolution (ViLTE) protocol, a Voice over Long Term Evolution (VoLTE) protocol, a Short Message Service (SMS) protocol, or a Multimedia Messaging Service (MMS) protocol.

5. An apparatus configured for operation within a wireless communication network, the apparatus comprising:
one or more processors; and
a non-transitory storage medium comprising instructions stored thereon, the instructions being executable by the one or more processors to:
receive, from a first mobile device at a wireless communication network, a first request to register the first mobile device with the wireless communication network, wherein the wireless communication network provides services to mobile devices thereon and the first mobile device has an associated rate plan, a roaming status, a device type, and one or more specific billing rules associated therewith;
determine first permissible services provided by the wireless communication network to the first mobile device, wherein the determining comprises selecting, by the presence server of the wireless communication network, from amongst the services provided to mobile devices by the wireless network services that are available to the rate plan, the roaming status, the device type, and the one or more specific billing rules associated therewith associated with the first mobile device, wherein the first permissible services includes the services selected by the presence server for the first mobile device;
receive, from the first mobile device at the wireless communication network, a second request related to capabilities of a second mobile device, the capabilities relating to second permissible services provided by the wireless communication network to the second mobile device, wherein the second mobile device has an associated rate plan, a roaming status, a device type, and one or more specific billing rules associated therewith;
determine, by the presence server of the wireless communication network, second permissible services provided by the wireless communication network to the second mobile device, wherein the determining comprises selecting, by the presence server of the wireless communication network, from amongst the services provided to mobile devices by the wireless network services that are available to the second mobile device based on the rate plan, the roaming status, the device type, and the one or more specific billing rules associated with the second mobile device, wherein the second permissible services includes the services selected by the presence server for the second mobile device; and
provide, to the first mobile device, one or more services, the one or more services by the wireless network that are common to the first permissible services and the second permissible services.

6. The apparatus of claim 5, wherein the instructions are executable by the one or more processors to:
determine the first permissible services provided by the wireless communication network to the first mobile device includes the presence server of the wireless communication network obtaining information from one or more of (i) a Policy and Charging Rules Function (PCRF) node of the wireless communication network, (ii) an Equipment Identity Register (EIR) node of the wireless communication network, and (iii) an Online Charging System (OCS) node of the wireless communication network; and
determine the second permissible services provided by the wireless communication network to the second mobile device includes the presence server of the wireless communication network obtaining information from one or more of (i) a Policy and Charging Rules Function (PCRF) node of the wireless communication network, (ii) an Equipment Identity Register (EIR) node of the wireless communication network, and (iii) an Online Charging System (OCS) node of the wireless communication network.

7. The apparatus of claim 5, wherein the instructions are executable by the one or more processors to the second permissible services provided by the wireless communication network to provide to the second mobile device relate to at least one or more of Unitary Precoding (UP), Rich Communication Services (RCS), a Video over Long Term Evolution (ViLTE) protocol, a Voice over Long Term Evolution (VoLTE) protocol, a Short Message Service (SMS) protocol, or a Multimedia Messaging Service (MMS) protocol.

8. The apparatus of claim 5, wherein the first permissible services provided by the wireless communication network to the first mobile device relate to at least one or more of Unitary Precoding (UP), Rich Communication Services (RCS), a Video over Long Term Evolution (ViLTE) protocol, a Voice over Long Term Evolution (VoLTE) protocol, a Short Message Service (SMS) protocol, or a Multimedia Messaging Service (MMS) protocol.

9. A non-transitory storage medium comprising instructions stored thereon, the instructions being executable by one or more processors to:
- receive, from a first mobile device at a wireless communication network, a first request to register the first mobile device with the wireless communication network, wherein the wireless communication network provides services to mobile devices thereon and the first mobile device has an associated rate plan, a roaming status, a device type, and one or more specific billing rules associated therewith;
- determine first permissible services provided by the wireless communication network to the first mobile device, wherein the determining comprises selecting, by the presence server of the wireless communication network, from amongst the services provided to mobile devices by the wireless network services that are available to the rate plan, the roaming status, the device type, and the one or more specific billing rules associated therewith associated with the first mobile device, wherein the first permissible services includes the services selected by the presence server for the first mobile device;
- receive, from the first mobile device at the wireless communication network, a second request related to capabilities of a second mobile device, the capabilities relating to second permissible services provided by the wireless communication network to the second mobile device, wherein the second mobile device has an associated rate plan, a roaming status, a device type, and one or more specific billing rules associated therewith;
- determine, by the presence server of the wireless communication network, second permissible services provided by the wireless communication network to the second mobile device, wherein the determining comprises selecting, by the presence server of the wireless communication network, from amongst the services provided to mobile devices by the wireless network services that are available to the second mobile device based on the rate plan, the roaming status, the device type, and the one or more specific billing rules associated with the second mobile device, wherein the second permissible services includes the services selected by the presence server for the second mobile device;
- provide, to the first mobile device, one or more services, the one or more services by the wireless network that are common to the first permissible services and the second permissible services; and
- enable, by the wireless communication network, communication between the first mobile device and the second mobile device using the one or more services by the wireless network that are common to the first permissible services and the second permissible services.

10. The non-transitory storage medium of claim 9, wherein the instructions are executable by the one or more processors to network the second permissible services provided by the wireless communication network to provide to the second mobile device relate to at least one or more of Unitary Precoding (UP), Rich Communication Services (RCS), a Video over Long Term Evolution (ViLTE) protocol, a Voice over Long Term Evolution (VoLTE) protocol, a Short Message Service (SMS) protocol, or a Multimedia Messaging Service (MMS) protocol.

11. The non-transitory storage medium of claim 9, wherein the instructions are executable by the one or more processors to determine the first permissible services provided by the wireless communication network to the first mobile device by obtaining information related to one or more of an associated rate plan of the first mobile device, a roaming status of the first mobile device, a device type of the first mobile device, and one or more specific billing rules with respect to the first mobile device.

12. The method of claim 1 further comprising limiting, by the wireless communication network, communication between the first mobile device and the second mobile device via services other than the one or more services.

13. The apparatus of claim 5, wherein the instructions are executable by the one or more processors to limit, by the wireless communication network, communication between the first mobile device and the second mobile device via services other than the one or more services.

14. The non-transitory storage medium of claim 9, wherein the instructions are executable by the one or more processors to limit, by the wireless communication network, communication between the first mobile device and the second mobile device via services other than the one or more services.

* * * * *